United States Patent
Rohn et al.

(10) Patent No.: US 6,649,681 B2
(45) Date of Patent: *Nov. 18, 2003

(54) ADHESIVE COMPOSITION PRIMARILY INTENDED FOR USE IN MEDICAL APPLICATIONS

(75) Inventors: Andrew M. Rohn, Clinton, OH (US); Anthony S. Scheibelhoffer, Norton, OH (US); James T. Kempthorn, Cuyahoga Falls, OH (US); Kenneth D. Zabielski, McHenry, IL (US); Deenadayalu Chundury, Newburgh, IN (US); Timothy W. Birch, Ravenna, OH (US)

(73) Assignee: Ferro Corporation, Cleveland, OH (US)

( * ) Notice: Subject to any disclaimer, the term of this patent is extended or adjusted under 35 U.S.C. 154(b) by 68 days.

This patent is subject to a terminal disclaimer.

(21) Appl. No.: 09/777,019

(22) Filed: Feb. 5, 2001

(65) Prior Publication Data

US 2001/0036989 A1 Nov. 1, 2001

Related U.S. Application Data

(60) Provisional application No. 60/179,978, filed on Feb. 3, 2000.

(51) Int. Cl.$^7$ .................................................. C08K 5/07
(52) U.S. Cl. ........................ 524/356; 524/98; 524/315; 524/354; 524/357; 524/481; 524/483; 524/484
(58) Field of Search ........................ 524/356, 98, 315, 524/354, 357, 481, 483, 484

(56) References Cited

U.S. PATENT DOCUMENTS

| | | | |
|---|---|---|---|
| 3,797,494 A | * 3/1974 | Zaffaroni | ..................... 128/268 |
| 5,264,280 A | 11/1993 | Chundury et al. | ........... 428/330 |
| 5,374,680 A | 12/1994 | Chundury et al. | ............. 525/71 |
| 5,385,781 A | 1/1995 | Chundury et al. | ........... 428/330 |
| 6,180,244 B1 | * 1/2001 | Rayner et al. | ............ 428/424.8 |
| 6,387,524 B1 | * 5/2002 | Finefrock | ................... 428/461 |
| 6,465,558 B2 | * 10/2002 | Scheibelhoffer et al. | ..... 524/483 |

* cited by examiner

Primary Examiner—Peter D. Mulcahy
(74) Attorney, Agent, or Firm—Rankin, Hill, Porter & Clark LLP

(57) ABSTRACT

The present invention provides an adhesive composition for use in bonding a polymeric fitting to an olefin-containing component of an article used in medical applications. The adhesive composition according to the invention includes an adhesive polymer system dissolved in a solvent system. The solvent system includes an organic solvent having a solubility parameter within the range of from about 7.5 to about 10 $(cal/cm^3)^{1/2}$. Subsequent to forming a bond between the polymeric fitting and the olefin-containing component, the adhesive composition can meet the requirements for USP Class VI materials. In a preferred embodiment of the invention, the adhesive composition includes a low shear mixture of an adhesive polymer system including an atactic polypropylene and a low density polyethylene that is dissolved in a solvent system including a blend of d-limonene and a ketone selected from the group consisting of 4-heptanone and cyclohexanone. The adhesive composition can be used, for example, to bond polymeric fittings made of materials such as, but not limited to, acrylic, polycarbonate, polyvinyl chloride, polyolefin, acrylonitrile butadiene-styrene, and polyester, to olefin-containing components of articles used in medical applications such as, but not limited to, tubing.

20 Claims, No Drawings

ADHESIVE COMPOSITION PRIMARILY INTENDED FOR USE IN MEDICAL APPLICATIONS

RELATED APPLICATIONS

This application claims the benefit of U.S. Provisional Application Ser. No. 60/179,978, filed Feb. 3, 2000.

FIELD OF INVENTION

The present invention concerns an adhesive composition primarily intended for use in medical applications, and more particularly an adhesive composition primarily intended for use in bonding polymeric fittings to olefin-containing components of articles used in medical applications.

BACKGROUND OF THE INVENTION

For many years, polyvinyl chloride (PVC) has been the most prevalently used polymer in medical applications such as, for example, IV and blood bags, surgical tubing and related components, catheters, and inhalation masks. Alone, PVC is a hard and rigid substance. However, when PVC is plasticized with any one of several U.S. Food and Drug Administration (FDA) sanctioned plasticizers such as, for example, di-ethylhexyl phthalate (DEHP), tri (2-ethylhexyl) trimellitate (TOTM), and citrate esters, PVC becomes flexible yet strong, kink resistant, and can be easily solvent welded to other polymeric components using solvents such as cyclohexanone.

Although PVC has been widely used in medical applications successfully for many years, medical device manufacturers have recently been developing products that are fabricated from materials other than PVC. Several companies such as Ferro Corporation, the assignee of the present invention, are now marketing strong, flexible, transparent, FDA sanctioned olefin-containing compositions (which are also sometimes referred to as polyolefin alloys) as an alternative to PVC for use in medical applications. These proprietary olefin-containing compositions generally offer improved strength and flexibility characteristics when compared with PVC, but more importantly also provide a non-plasticized DEHP-free product.

While olefin-containing compositions offer some advantages over PVC and other polymers used in medical applications, the use of such olefin-containing materials has been hindered to some degree by the difficulties presented in bonding such materials to fittings made from polymeric materials such as polyester, high density polyethylene, acrylonitrile butadiene styrene, polyolefins, polycarbonate, and acrylic. Due to their low solubility in many solvents and their low surface energy, it is difficult, generally speaking, to obtain good adhesion of polymeric fittings to olefin-containing components using conventional adhesives.

For these and other reasons, an adhesive composition is needed that can be used to bond a polymeric fitting to an olefin-containing component of an article used in medical applications. Such an adhesive composition must contain only FDA sanctioned materials (e.g., materials that meet the requirements for USP Class VI) and must provide excellent adhesion between olefin-containing components and fittings formed from a variety of polymers.

SUMMARY OF INVENTION

The present invention provides an adhesive composition for use in bonding a polymeric fitting to an olefin-containing component of an article used in medical applications. The adhesive composition according to the invention comprises an adhesive polymer system dissolved in a solvent system. The solvent system comprises an organic solvent having a solubility parameter within the range of from about 7.5 to about 10 $(cal/cm^3)^{1/2}$. Subsequent to forming a bond between the polymeric fitting and the olefin-containing component, the adhesive composition can meet the requirements for USP Class VI materials. In a preferred embodiment of the invention, the adhesive composition comprises a low shear mixture of an adhesive polymer system comprising an atactic polypropylene and a low density polyethylene that is dissolved in a solvent system comprising a blend of d-limonene and a ketone selected from the group consisting of 4-heptanone and cyclohexanone.

The adhesive composition can be used, for example, to bond polymeric fittings made of materials such as, but not limited to, acrylic, polycarbonate, polyvinyl chloride polyolefin, acrylonitrile butadiene-styrene, and polyester, to olefin-containing components of articles used in medical applications such as, but not limited to, tubing. The present invention also provides a method of making the adhesive composition and a method of bonding a polymeric fitting to an olefin-containing component of an article used for medical applications using the adhesive composition.

DETAILED DESCRIPTION

The present invention provides an adhesive composition for use in bonding a polymeric fitting to an olefin-containing component of an article used in medical applications. Unless the context clearly indicates otherwise, as used in the instant specification and in the appended claims, the term "olefin-containing" means that the material contains one or more thermoplastic polymers derived from olefin monomers. Olefin-containing materials can be homopolymers of olefin monomers, copolymers derived in part from olefin monomers, and polyblends that contain such olefinic homopolymers and/or copolymers blended with other polymers. Olefin-containing materials of this type are sometimes referred to herein as olefin alloys. As noted above, this application claims benefit of U.S. Provisional Application Ser. No. 60/179,978, filed Feb. 3, 2000, which is hereby incorporated by reference in its entirety.

Most of the commercial producers of olefin alloys used in medical applications regard the exact formulation of their materials as proprietary information. In general, these commercially available olefin alloys contain a major part of an olefinic homopolymer or copolymer and minor amounts of other polymers and other additive materials. For example, Ferro Corporation, the assignee of the present invention, markets a line of proprietary polyolefin alloys under the trade designation RxLoy™, such as Ferro Product Code No. NPP00NR02NA (hereinafter "Ferro NR02"), which includes a major amount of low density polypropylene, a lesser amount of metallocene copolymer of ethylene octene and hexene, and a minor amount of ethylene vinyl acetate and other functional additives.

The adhesive composition according to the present invention is particularly useful for bonding polymeric fittings to olefin-containing components used in medical applications such as NR02 tubing. Polymeric fittings used in medical applications are typically formed from materials such as, for example, polycarbonate resin, high density polyethylene, acrylic resin, acrylonitrile-butadiene-styrene resin, polyester resin, olefin-containing alloys, and block copolymers of polystyrene and polyisoprene.

The adhesive composition according to the present invention comprises an adhesive polymer system dissolved in a solvent system. Subsequent to forming a bond between the polymeric fitting and the olefin-containing component, the adhesive composition according to the invention is capable of meeting the requirements for USP Class VI materials. As used in the instant specification and in the appended claims, phrases such as "meets the requirements for USP Class VI materials" or the like mean that a material meets or exceeds the "Biological Reactivity Tests, in Vivo" for Class VI materials set forth in USP XXIII. These tests are described in detail at col. 4, line 35 through col. 11, line 26 of Lee et al., U.S. Pat. No. 5,925,246, and that portion of Lee et al. is hereby incorporated by reference.

Each of the components of the adhesive composition, as well as the most preferred embodiment of the invention, is separately discussed in greater detail below.

Solvent System

The adhesive composition according to the present invention comprises a solvent system. Preferably, the solvent system comprises from about 65% to about 97% of the adhesive composition by weight. The solvent system preferably comprises a blend of at least two compatible organic solvents. Compatible organic solvents are solvents that are miscible and do not undergo phase separation upon standing.

The solvents in the solvent system preferably have a solubility parameter within the range of from about 7.5 to about 10 $(cal/cm^3)^{1/2}$, more preferably from about 7.9 to about 9.0 $(cal/cm^3)^{1/2}$, and most preferably from about 8.1 to about 8.8 $(cal/cm^3)^{1/2}$. The term "solubility parameter", as used in this specification and in the appended claims, is the same as is defined in the *Polymer Handbook*, J. Brandrup, E. H. Immergut, Editors, Third Edition (1989), pages 519 et seq., which is hereby incorporated by reference. The *Polymer Handbook* provides a listing of the solubility parameters for many common solvents, but it may be necessary to calculate the solubility parameter of a solvent using the guidelines set forth in the *Polymer Handbook* or by other acceptable experimental methods, which are known.

Preferably, the solvent system comprises from about 5% to about 50% of a terpene by weight. The preferred terpene for use in the solvent system is limonene. Limonene is a widely distributed optically active terpene that occurs naturally in both the d- and l-forms. The racemic mixtures of the two isomers is known as dipentene. The terms limonene and dipentene are used interchangeably. The most preferred terpene for use in the present invention is d-limonene. d-limonene has a solubility parameter of 8.24 $(cal/cm^3)^{1/2}$ (calculated). Dipentene has a solubility parameter of 8.5 $(cal/cm^3)^{1/2}$ (from table).

Preferably, the solvent system also comprises from about 50% to about 95% of a ketone by weight. Two preferred ketones for use in the invention are 4-heptanone and cyclohexanone. 4-heptanone is the presently most-preferred ketone for use in the solvent system for most adhesive bonding applications because it is a good solvent for the adhesive polymers and enhances the rate of volatilization of d-limonene the during bonding process. 4-heptanone has a solubility parameter of 8.5 $(cal/cm^3)^{1/2}$ (calculated). Cyclohexanone has a solubility parameter of 9.9 $(cal/cm^3)^{1/2}$ (table).

Those of skill in the art will appreciate that most of the medical fittings for use with tubing are typically either of the male or female type. In a male fitting, which is also known as a supported fitting, the tubing slides over a hollow post on the fitting, which can be provided with radially extending sabres or ribs to improve contact between the tubing and the fitting. When a supported fitting is used, the primary contact between the tubing and the fitting is made on the inner surface of the tubing. In a female fitting, which is also known as a non-supported fitting, the tubing slides into an orifice or hole in the fitting. When a non-supported fitting is used, the primary contact between the tubing and the female fitting is made on the outer surface of the tubing.

4-heptanone is the presently most-preferred ketone for use in the solvent system of the adhesive composition according to the present invention when the adhesive composition is being used to bond supported fittings to olefin-containing tubing. In such applications, 4-heptanone is the preferred ketone for use in the invention regardless of the composition of the supported fitting. However, in those applications wherein the polymeric fitting to be bonded to olefin-containing tubing comprises a "hard" polymer, such as polycarbonate or acrylic, and the polymeric fitting is a fitting of the non-supported type, the presently most-preferred ketone for use in the solvent system of the adhesive composition according to the invention is cyclohexanone. 4-heptanone is still most-preferred when the non-supported fitting comprises a "soft" polymer, such as polyolefin and copolyesters.

Adhesive Polymer System

The adhesive composition according to the present invention also comprises an adhesive polymer system. Preferably, the adhesive polymer system comprises from about 3% to about 35% of the adhesive composition by weight. Preferably, the adhesive polymer system comprises one or a blend of adhesive polymers having a solubility parameter within the range of from about 7.5 to about 10 $(cal/cm^3)^{1/2}$, more preferably from about 7.9 to about 9.0 $(cal/cm^3)^{1/2}$, and most preferably from about 8.1 to about 8.8 $(cal/cm^3)^{1/2}$. The solubility parameters for a number of polymers are listed in the *Polymer Handbook* or can be calculated using the guidelines set forth therein. In a preferred embodiment of the invention, the adhesive polymer system comprises a thermoplastic polymer, with polyolefins such as polypropylene being most preferred.

Applicants have discovered that the use of at least one atactic polymer as part of the adhesive polymer system generally improves the strength of the bond formed between the polymeric fitting and the olefin-containing component. Atactic polymers are polymers in which the substituent groups or atoms are arranged randomly above and below the backbone chain of atoms when the latter are all in the same plane. It is preferable that the atactic polymer be soluble in the solvent system at a temperature of less than about 125° F.

Atactic polypropylene is the presently most-preferred atactic polymer for use in the adhesive composition according to the invention. A number of relatively low molecular weight atactic polypropylenes are available commercially that have relatively low melt temperatures and are readily soluble in solvents such as terpenes and/or ketones.

It is preferable for the adhesive polymer system of the adhesive composition according to the present invention to comprise a blend of thermoplastic polymers comprising at least two polymers selected from the group consisting of polypropylene, polyethylene, and polystyrene. It will be appreciated that other polymers can be present in the adhesive composition in minor amounts, usually less than about 25% by weight of all polymers in the adhesive composition, without degrading or adversely affecting the adhesive composition.

The adhesive composition according to the invention can also comprise one or more thermosetting polymers. A preferred thermosetting polymer comprises trimethylolpropane triacrylate, which is UV curable. It will be appreciated that other thermosetting polymers can also be used.

Preparation

The present invention also provides a novel method of preparing an adhesive composition for use in joining a polymeric fitting to an olefin-containing component of an article used in medical applications. The method of preparing an adhesive composition according to the present invention comprises mixing at low shear an adhesive polymer system dissolved in a solvent system. In a preferred embodiment, the adhesive polymer system comprises at least one polyolefin and an atactic polymer, preferably polypropylene, and the solvent system comprises a blend of about 80% by weight 4-heptanone and about 20% by weight d-limonene. The polyolefin used in the adhesive polymer system can sometimes be obtained, if appropriate, by dissolving a portion of the olefin-containing component of the article to which the polymeric fitting is to be bonded in the solvent system.

The order in which the various components of the adhesive composition are introduced together is not per se critical, but it is critical that the mixture be mixed at low shear. If the adhesive composition is mixed at high shear, the composition becomes unuseable. Preferably, the components of the solvent system are mixed together and then heated to a temperature of from about 100–125° F. Next, an appropriate quantity of the adhesive polymer system is dissolved in the solvent system. In some instances, the adhesive polymer system can be dissolved in the solvent system at a temperature greater than 125° F., but elevated temperatures should be avoided whenever possible to avoid cross-linking risks. Finally, the mixture is mixed at low shear. The adhesive can be stored at ambient room temperature in an air-tight container for an indefinite period of time without separating or gelling.

Use

The present invention also provides a method of bonding polymeric fittings to olefin-containing components of articles used in medical applications. The method according to the present invention comprises providing a polymeric fitting, providing an olefin-containing component, providing an adhesive composition comprising a low shear mixture of an adhesive polymer system dissolved in a solvent system, bringing the polymeric fitting and the olefin-containing component into contact with each other in the presence of the adhesive composition, and allowing the adhesive composition to bond the polymeric fitting and the olefin-containing component together.

The adhesive composition can be applied to the polymeric fitting, the olefin-containing component, or both. The manner in which the adhesive composition is applied is not per se critical. Preferably, the adhesive composition is applied by dipping or using a brush and coating a thin layer of the adhesive on the tubing part. Preferably, the adhesive composition is applied when it is warm (typically about 90° F. to about 100° F.). When the adhesive composition contains a thermosetting polymer such as trimethylolpropane triacrylate or the like, it will be necessary to expose the fitting to UV light to cure the adhesive.

In one preferred embodiment of the invention, the polymeric fitting comprises a fitting for connection to medical tubing and the olefin-containing component comprises medical tubing. The adhesive composition is applied where the polymeric fitting contacts the olefin-containing component. Twisting the connection approximately one-quarter turn by hand ensures good coating of the adhesive composition to both parts to be bonded. The adhesive composition is then permitted to dry. In order to ensure complete drying, the fitting and tubing being bonded together can be heated to a temperature of about 140° F. for about 3 to about 15 minutes. When the adhesive composition contains a thermosetting polymer, such as a UV curable polymer, the connection can be exposed to UV light to complete bonding.

The bond formed using the adhesive composition according to the invention between a polymeric fitting and an olefin-containing component is extremely strong. In some cases, polyolefin alloy tubing bonded to polymeric fittings typically will fail in a pull test before the bond fails. The adhesive composition is particularly useful for bonding fittings to polyolefin alloy medical tubing, and for fabricating other articles used in medical applications, but its use is not limited to medical applications.

The following examples are intended only to illustrate the invention and should not be construed as imposing limitations upon the claims:

EXAMPLE 1

An adhesive composition according to the invention was prepared by mixing the following components together at low shear at 120° F. until a homogeneous mixture was obtained: 25.5 g. of d-limonene; 59.5 g. of 4-heptanone; 7.5 g. atactic polypropylene; and 7.5 g. of Ferro NR02. The adhesive composition was permitted to cool to 90° F. and was then was applied using a brush to the interior cavity of an unsupported polyolefin alloy medical tubing connector and to the end of a length of polyolefin alloy medical tubing (Ferro NR02). The two parts were pressed together by hand using a twisting motion to ensure complete wetting of the adhesive composition at the interface between the two parts. The tubing and connector was then placed in an oven and heated to a temperature of about 140° F. for about 15 minutes. Upon cooling to room temperature, the connection was pull tested. The polyolefin alloy tubing failed at a point other than at the connection.

EXAMPLE 2

Adhesive Composition A was prepared by dissolving 10 parts by weight polyolefin alloy (Ferro NR02) and 1 part by weight atactic polypropylene (Hunstman Chemical RT2315) in 89 parts by weight of a solvent system comprising 80% 4-heptanone and 20% d-limonene. The solids content of the adhesive is preferably equal to or greater than 10% by weight but not greater than 12% by weight. The mixture was mixed at low shear at a temperature of about 120° F. until homogenous and then allowed to cool to room temperature.

Adhesive Composition B was prepared by dissolving 10 parts by weight of a hydrogenated polystyrene/vinyl polyisoprene block copolymer (sold by Kuraray Co. Ltd. of Japan as Hybrar® 7125), 1 part by weight atactic polypropylene (Huntsman Chemical RT2315), and 89 parts by weight of a solvent system comprising 80% 4-heptanone and 20% d-limonene. The mixture was mixed at low shear at a temperature of about 120° F. until homogenous and then allowed to cool to room temperature.

Adhesive Composition C was prepared by dissolving 10 parts by weight of a polystryrene/vinyl polyisoprene alloy (sold by Kuraray Co. Ltd. of Japan as Hybrar® 7125), 1 part by weight atactic polypropylene (Hunstman RT2315), and 89 parts by weight of a solvent system comprising 70% cyclohexanone and 30% d-limonene. The mixture was mixed at low shear at a temperature of about 120° F. until homogenous and then allowed to cool to room temperature.

Adhesive Composition D was prepared by dissolving 10 parts by weight atactic polypropylene (Hunstman RT2315) and 90 parts by weight of a solvent system comprising 80% 4-heptanone and 20% d-limonene. The mixture was mixed at low shear at a temperature of about 120° F. until homogenous and then allowed to cool to room temperature.

Adhesive Composition E was prepared by dissolving 9 parts by weight of a metallocene ethylene/1-octene copolymer (Dow-Du Pont Grade 8999), 1 part by weight atactic polypropylene, and 90 parts by weight of a solvent system comprising 50% by weight 4-heptanone and 50% by weight d-limonene. The mixture was mixed at low shear at a temperature of about 120° F. until homogenous and then allowed to cool to room temperature.

Plaques of polycarbonate (GE Lexan® 144), high density polyethylene ("HDPE") (Dow Grade 10462N), acrylic (Rohm & Haas Plexiglas Acrylic Sheet), acrylonitrile-butadiene-styrene ("ABS") (General Polymers 344HP NT), copolyester (Du Pont Hytrel®), polyolefin alloy (Ferro NR02), and polystyrene/vinyl polyisoprene copolymer (sold by Kuraray Co. Ltd. of Japan as Hybrar® 7125), each having a thickness of approximately 0.125" inch were cut into strips 3" long and 1" wide. Adhesives A, B, C, D and E were warmed to 90° F. and then used to bond a plaque of a particular polymer to an identically sized plaque of Ferro NR02 in such a manner as to produce a ½" overlapping joint ("lap joint"). After the two plaques were bonded together using the adhesive composition, opposing ends of the plaques (on either side of the lap joint) were gripped by an Instron tensiometer and the amount of force required to achieve bond failure was recorded for each polymer type and adhesive composition used. The results are reported in Tables 1 through 7 below:

TABLE 1

Polyolefin Alloy (Ferro NR02) to Polycarbonate

| Adhesive Composition | Bond Fail Strength | Surface Treatment |
|---|---|---|
| A | 83.7 psi | None |
| A | 77.6 psi | Plasma(A) |
| B | 63.8 psi | Plasma |
| C | not tested | — |
| D | NAE(B) | Plasma |
| E | NAE | None |
| E | 11.5 psi | Plasma |

(A)In Tables 1–7, the term Plasma denotes that the substrate to which the Ferro NR02 plaque was bonded was treated using an Intercon Plasma Discharge unit for 60 seconds prior to application of the adhesive composition.
(B)In Tables 1–7, the term NAE denotes that no adhesive effect was observed between the two plaques.

TABLE 2

Polyolefin Alloy (Ferro NR02) to High Density Polyethylene (HDPE)

| Adhesive Composition | Bond Fail Strength | Surface Treatment |
|---|---|---|
| A | 41.3 psi | None |
| A | 27.1 psi | Primed - 1.5%(C) |
| A | 22.8 psi | Primed(D) |
| A | 25.2 psi | Ozone(E) |
| A | 43.9 psi | Plasma |
| B | 27.0 psi | Primed |

TABLE 2-continued

Polyolefin Alloy (Ferro NR02) to High Density Polyethylene (HDPE)

| Adhesive Composition | Bond Fail Strength | Surface Treatment |
|---|---|---|
| B | 15.8 psi | Plasma |
| C | 37.7 psi | None |
| D | 31.0 psi | Plasma |
| D | 22.5 psi | Primed |
| E | NAE | None |
| E | 25.2 psi | Plasma |

(C)In Tables 2 and 5, "Primed - 1.5%" denotes that a primer solution comprising 1.5% by weight Lotadur AT2313 Primer dissolved in the solvent solution was applied as a thin film using a brush to the substrate to which the Ferro NR02 was to be bonded approximately 5 minutes prior to bonding.
(D)In Tables 2–7, "Primed" denotes that a primer solution comprising 0.25% by weight Lotadur AT2313 Primer dissolved in the solvent solution was applied as a thin film using a brush to the substrate to which the Ferro NR02 was to be bonded approximately 5 minutes prior to bonding.
(E)The substrate to which the Ferro NR02 was bonded was placed in an ozone chamber for 15 minutes immediately prior to application of the adhesive composition.

TABLE 3

Polyolefin Alloy (Ferro NR02) to Acrylic

| Adhesive Composition | Bond Fail Strength | Surface Treatment |
|---|---|---|
| A | 63.3 psi | None |
| A | 49.0 psi | Plasma |
| B | 59.5 psi | Primed |
| B | 52.5 psi | Plasma |
| C | 68.6 psi | None |
| D | 28.0 psi | Plasma |
| E | NAE | None |
| E | NAE | Plasma |

TABLE 4

Polyolefin Alloy (Ferro NR02) to ABS

| Adhesive Composition | Bond Fail Strength | Surface Treatment |
|---|---|---|
| A | 67.3 psi | None |
| A | 67.7 psi | Plasma |
| B | 66.6 psi | Primed |
| B | 61.2 psi | Plasma |
| C | 84.0 psi | None |
| D | 13.7 psi | Plasma |
| E | NAE | None |
| E | NAE | Plasma |

TABLE 5

Polyolefin Alloy (Ferro NR02) to Copolyester

| Adhesive Composition | Bond Fail Strength | Surface Treatment |
|---|---|---|
| A | 11.2 psi | None |
| A | 27.2 psi | Primed - 1.5% |
| A | 36.1 psi | Primed |
| A | 32.5 | Plasma |
| B | 32.9 psi | Primed |
| B | 34.8 psi | Plasma |
| C | 41.1 psi | None |
| D | 21.0 psi | Plasma |
| D | 17.0 psi | Primed |
| E | NAE | None |
| E | NAE | Plasma |

TABLE 6

Polyolefin Alloy (Ferro NR02) to Polyolefin Alloy (Ferro NR02)

| Adhesive Composition | Bond Fail Strength | Surface Treatment |
| --- | --- | --- |
| A | 140.4 psi | None |
| A | 82.6 psi | Plasma |
| B | 110.5 psi | Primed |
| B | 87.4 psi | Plasma |
| C | 101.0 psi | None |
| D | 41.0 psi | Plasma |
| E | NAE | None |
| E | 61.9 Psi | Plasma |

TABLE 7

Polyolefin Alloy (Ferro NR02) to Hybrar

| Adhesive Composition | Bond Fail Strength | Surface Treatment |
| --- | --- | --- |
| A | 69.0 psi(F) | Plasma |
| B | 81.9 psi(F) | Plasma |
| C | Not tested | — |
| D | NAE | Plasma |
| E | NAE | None |
| E | 62.4 psi | Plasma |

(F)The Hybrar ® plaque failed - there was no failure of the adhesive bond formed between the two films.

Applicants believe that an adhesive bond having a lap joint fail strength of greater than about 40 psi is considered to be highly desirable and acceptable for most medical applications requiring tubing to be bonded to the stated polymers. However, adhesive bonds having a fail strength of less than about 40 psi are also useful in many medical applications, particularly where the fitting being bonded to the olefin-containing material provides some mechanical assistance in forming the bond.

Surface treatments of various types, such as plasma discharge, corona discharge, flame, ozone, and chemical primers, appear to improve the bond strength between the olefin-containing material and other polymers in some instances, but not in others.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed:

1. An adhesive composition for use in bonding a polymeric fitting to an olefin-containing component of an article used in medical applications, said adhesive composition comprising:
   from about 65% to about 97% by weight of a solvent system, said solvent system comprising a blend of at least two organic solvents having a solubility parameter within the range of from about 7.5 to about 10 (cal/cm$^3$)$^{1/2}$, said solvent system comprising from about 5% to about 50% of a terpene by weight and from about 50% to about 95% of a ketone by weight; and
   an adhesive polymer system dissolved in said solvent system;
   wherein said adhesive composition subsequent to forming a bond between said polymeric fitting and said olefin-containing component meets the requirements for USP Class VI materials.

2. The adhesive composition according to claim 1 wherein said terpene comprises d-limonene.

3. The adhesive composition according to claim 2 wherein said ketone is selected from the group consisting of 4-heptanone and cyclohexanone.

4. The adhesive composition according to claim 1 wherein said adhesive polymer system dissolved in said solvent system comprises from about 3% to about 35% of said adhesive composition by weight.

5. The adhesive composition according to claim 4 wherein said adhesive polymer system dissolved in said solvent system comprises a thermoplastic polymer.

6. The adhesive composition according to claim 5 wherein said thermoplastic polymer comprises a polyolefin.

7. The adhesive composition according to claim 6 wherein said polyolefin comprises polypropylene.

8. The adhesive composition according to claim 7 wherein said polypropylene is atactic.

9. The adhesive composition according to claim 5 wherein said adhesive polymer system further comprises a thermosetting polymer.

10. The adhesive composition according to claim 9 wherein said thermosetting polymer comprises trimethylolpropane triacrylate.

11. The adhesive composition according to claim 4 wherein said adhesive polymer system comprises a blend of thermoplastic polymers.

12. The adhesive composition according to claim 11 wherein said blend of thermoplastic polymers comprises at least two polymers selected from the group consisting of polypropylene, polyethylene, and polystyrene.

13. The adhesive composition according to claim 1 wherein said polymeric fitting is formed from a material selected from the group consisting of polycarbonate resin, high density polyethylene, acrylic resin, acrylonitrile-butadiene-styrene resin, polyester resin, olefin containing alloys, and block copolymers of polystyrene and polyisoprene.

14. The adhesive composition according to claim 1 wherein said polymeric fitting is a male fitting.

15. The adhesive composition according to claim 1 wherein said polymeric fitting is a female fitting.

16. An adhesive composition for use in bonding a polymeric structure to an olefin-containing component of an article used in medical applications, said adhesive composition comprising a low shear mixture of an atactic polypropylene and a low density polyethylene dissolved in from about 65% to about 97% by weight of a solvent system comprising a blend of from about 5% to about 50% by weight d-limonene and from about 50% to about 95% by weight of a ketone selected from the group consisting of 4-heptanone and cyclohexanone, said adhesive composition subsequent to forming a bond between said polymeric fitting and said olefin-containing component meeting the requirements for USP Class VI materials.

17. The adhesive composition according to claim 16 wherein said low shear mixture is mixed at a temperature of from about 110° F. to about 140° F.

18. The adhesive composition according to claim 16 wherein said polymeric fitting is formed from a material selected from the group consisting of acrylic, polycarbonate, polyvinyl chloride, polyolefin, acrylonitrile butadiene-styrene, and polyester.

19. The adhesive composition according to claim 16 wherein said olefin-containing component is tubing.

20. The adhesive composition according to claim 16 wherein said polymeric fitting has been surface treated prior to bonding.

* * * * *